United States Patent [19]

Feist

[11] Patent Number: 4,533,521

[45] Date of Patent: Aug. 6, 1985

[54] MIXING NOZZLE FOR TWO REACTANT COMPONENTS

[75] Inventor: Norbert Feist, Hilchenbach, Fed. Rep. of Germany

[73] Assignee: Battenfeld Maschinenfabrik GmbH, Meinerzhagen, Fed. Rep. of Germany

[21] Appl. No.: 626,054

[22] Filed: Jun. 29, 1984

[30] Foreign Application Priority Data

Jun. 29, 1983 [DE] Fed. Rep. of Germany ....... 3323366

[51] Int. Cl.³ ............................................. F04B 23/00
[52] U.S. Cl. .................................... 422/133; 425/132; 264/241; 264/328.6; 264/DIG. 83
[58] Field of Search ...................... 425/132; 264/328.6, 264/328.2, 241, DIG. 83; 422/133

[56] References Cited

U.S. PATENT DOCUMENTS

| | | | |
|---|---|---|---|
| 3,608,870 | 9/1971 | Oldridge | 422/133 X |
| 3,653,336 | 4/1972 | Komeko et al. | 425/132 |
| 3,706,515 | 12/1972 | Keuerleber et al. | 264/DIG. 83 X |
| 4,141,470 | 2/1979 | Schulte et al. | 264/DIG. 83 X |
| 4,170,440 | 10/1979 | Gusmer et al. | 422/133 X |
| 4,188,356 | 2/1980 | Weber et al. | 264/328.6 X |
| 4,190,409 | 2/1980 | Hehl | 425/132 |
| 4,314,963 | 2/1982 | Boden et al. | 264/DIG. 83 X |

FOREIGN PATENT DOCUMENTS 2007935  9/1971  Fed. Rep. of Germany .

*Primary Examiner*—J. Howard Flint, Jr.
*Attorney, Agent, or Firm*—Karl F. Ross; Herbert Dubno

[57] ABSTRACT

A mixing and extruding nozzle for two reactant components has a housing formed with a mixing chamber, a pair of parallel and oppositely directed faces flanking and turned away from the chamber, respective injection passages having inner ends opening into the chamber and outer ends opening at the respective faces, and respective outwardly open grooves in the faces offset from the passages. A valve-type rocker pivotal relative to the housing about an axis perpendicular to and traversing the two faces and offset from the passages and grooves has two like halves each formed with a face confronting the respective housing face and a feed passage opening at the respective rocker face offset from the axis. This rocker is pivotal about the axis relative to the housing between a feed position with the feed passages aligned with the respective injection passages and opening therethrough into the chamber and a return position with the feed passages out of alignment with the respective injection passages and communicating through the respective grooves with the respective return passages. Respective supplies feed the respective components separately under pressure to the respective feed passages and withdraw the respective components from the respective return passages. Respective seal rings are engaged between the rocker halves and the housing.

13 Claims, 7 Drawing Figures

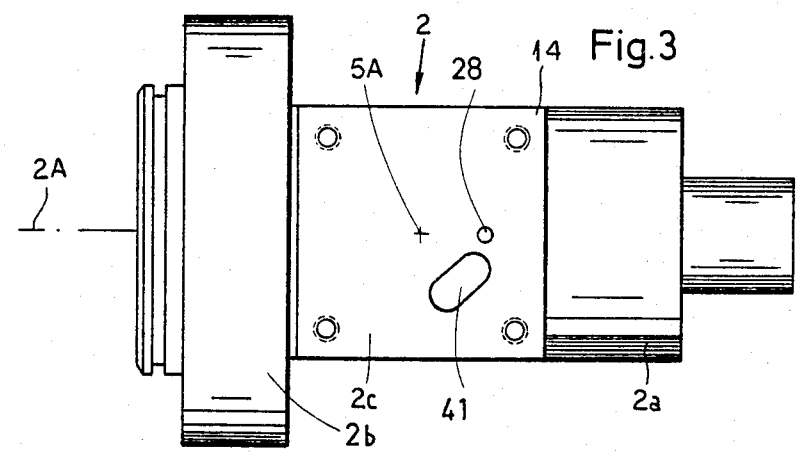
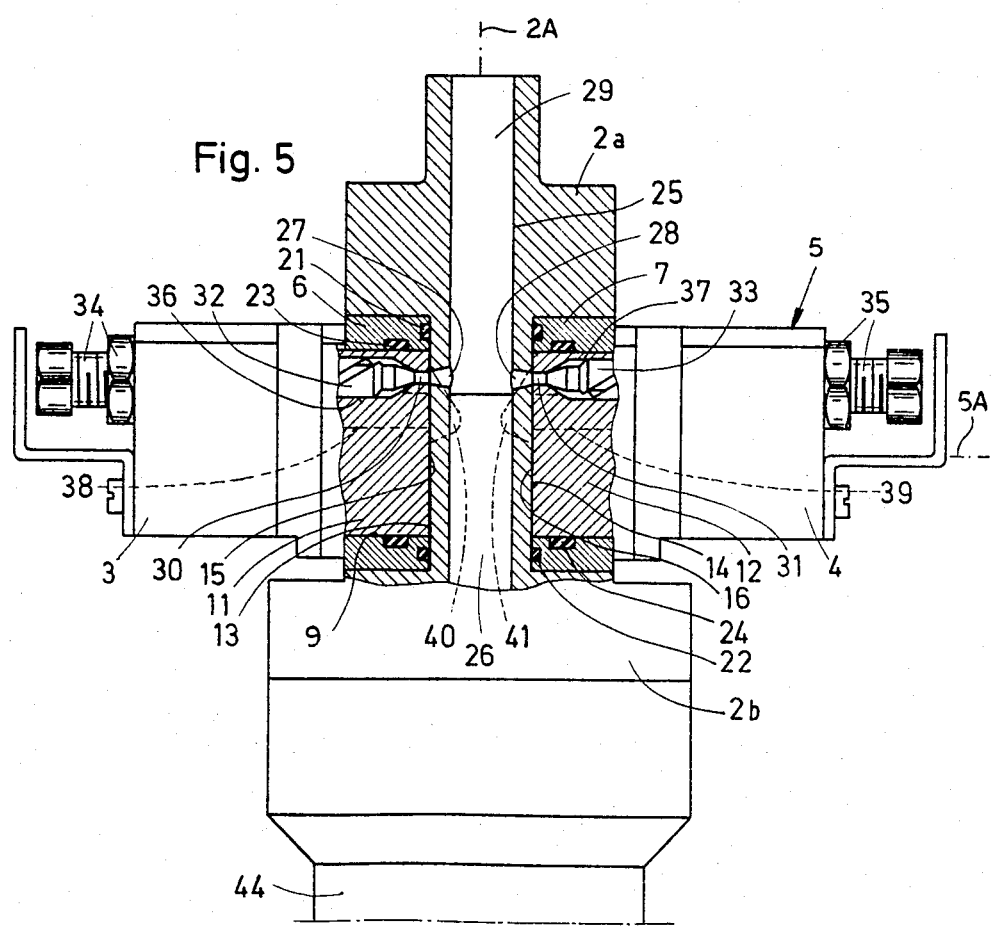

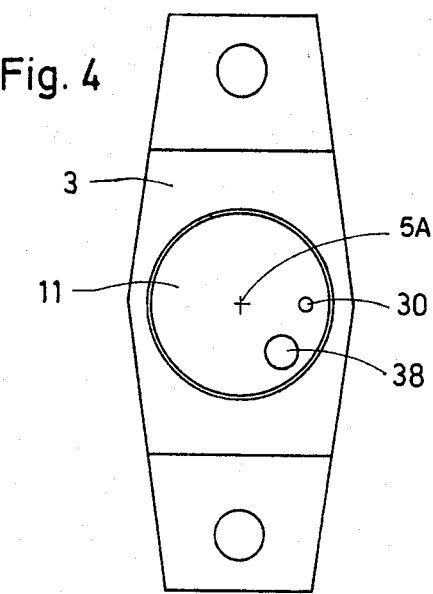
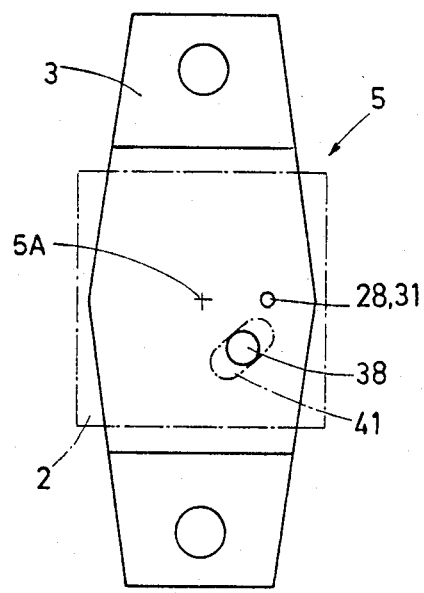
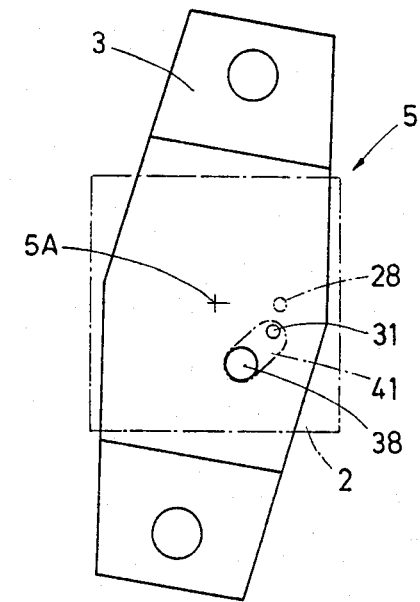

MIXING NOZZLE FOR TWO REACTANT COMPONENTS

FIELD OF THE INVENTION

The present invention relates to a nozzle for mixing and extruding two reactant components. More particularly this invention concerns a nozzle for manufacturing synthetic resins such as polyurethane.

BACKGROUND OF THE INVENTION

In the manufacture, for example, of urethane foams the foaming and polymer-forming reactions take place simultaneously, when excess isocyanate is mixed with a polyol. Similarly in the manufacture of epoxy the pot time, that is the amount of time between when the components are mixed and when they set, is very short. Thus it is necessary to mix these reactant components at the last possible moment before injecting the mixture into the mold cavity. Hence they are normally mixed right in a mixing chamber in the nozzle that itself is directly and closely connected to the mold.

Such a nozzle, as described in German patent document No. 2,007,935 of R. Keuerleber and F. Pahl is of three-part structure. Two generally identical outer parts or housing halves are connected to respective supplies of the components and have feed passages opening at confronting housing faces between which the third part of the housing can slide. This central third part is formed internally with the mixing chamber and with two injection passages or ports that open inward into the mixing chamber and outward on the third part at faces thereof that lie flatly against the respective faces of the housing halves. In a feed position of this slider each feed passage is aligned with the respective injection passage and opens therethrough into the mixing chamber. In a return position the slider blocks the outer ends of the injection passages and aligns a return passage connected back to the respective supply with each feed passage, so that there can be flow through the nozzle even as the batch is being extruded into the mold and there is no flow into the mixing chamber.

Similarly, in German patent No. 2,515,579 of P. Hartwig the slider is provided on its faces with a groove that forms a passage between the feed and return passages in the return position.

Such arrangements are fairly difficult to seal. The sliding joint must be perfectly machined and even so is very difficult to seal properly. In addition these devices often take up quite some room, making it impossible to fit them in cramped quarters, which are often all that is available in a molding operation. Furthermore these devices are relatively complex and therefore quite expensive to build and maintain.

OBJECTS OF THE INVENTION

It is therefore an object of the present invention to provide an improved mixing and extruding nozzle.

Another object is the provision of such a mixing and extruding nozzle which overcomes the above-given disadvantages, that is which is easy to seal and that nonetheless is of simple construction.

SUMMARY OF THE INVENTION

A mixing and extruding nozzle for two reactant components according to the invention has a housing formed with a mixing chamber, a pair of parallel and oppositely directed faces flanking and turned away from the chamber, respective injection passages having inner ends opening into the chamber and outer ends opening at the respective faces, and respective outwardly open grooves in the faces offset from the passages. A valve-type rocker pivotal relative to the housing about an axis perpendicular to and traversing the two faces and offset from the passages and grooves has two like halves each formed with a face confronting the respective housing face and a feed passage opening at the respective rocker face offset from the axis. This rocker is pivotal about the axis relative to the housing between a feed position with the feed passages aligned with the respective injection passages and opening therethrough into the chamber and a return position with the feed passages out of alignment with the respective injection passages and communicating through the respective grooves with the respective return passages. Respective supplies feed the respective components separately under pressure to the respective feed passages and withdraw the respective components from the respective return passages. Respective seal rings are engaged between the rocker halves and the housing. The rocker can be pivoted relative to the housing between the positions so that in the feed position the components pass from the respective feed passages through the respective injection passages into the chamber and in the return position the components flow from the feed passages through the respective grooves into the respective return passages.

With this system it is very easy to make the various elements seal very well, as the seal rings, which according to the invention are centered on the axis, can easily withstand considerable pressures without substantially impeding relative movement. The use of rocking movement allows the entire unit also be be made very compact.

According to this invention a piston is engageable in and through said chamber for extruding the resin therein when the rocker is in the return position. In addition the return passages are positioned at the rocker faces such that they open into the respective grooves even when the rocker is in the feed position. Furthermore although the rocker could be stationary, normally the housing is stationary and the rocker is pivotal thereon about the axis.

In accordance with further features of this invention the rocker has spacers secured rigidly between and rigidly interconnecting the two rocker halves. These spacers extend parallel to the axis, flank the housing, and each have springs urging the rocker faces axially toward each other and against the respective housing faces. Thus an extremely tight joint can be formed.

The rocker halves of this invention each have a cylindrical projection centered on the axis and having an end face constituting the respective rocker face. One seal annularly surrounds each such projection and the housing has respective cylindrical journals complementarily receiving the respective projections. Furthermore, seals can be also used that engage radially between the projections and the respective housings as well as axially between the journals and the housing faces. It is also within the scope of this invention to provide the seal with fluid-actuated biasing means to keep them tight, or to make them out of liquid barriers. These seal rings are all mounted in the respective journals which are fixed on the housing.

In order to meter flow accurately, each rocker half is provided with a valve for regulating the flow in the respective feed passage.

DESCRIPTION OF THE DRAWING

The above and other features and advantages will become more readily apparent from the following, reference being made to the accompanying drawing in which:

FIGS. 3 and 4 are side views taken along respective lines III—III and IV—IV of FIG. 2 of the housing and one rocker half;

FIG. 5 is a side view partly in horizontal cross section along line V—V of FIG. 1 of the apparatus; and FIGS. 6 and 7 are partly schematic side views corresponding generally to FIG. 4 showing the two positions of the rocker.

SPECIFIC DESCRIPTION

Figure 1:
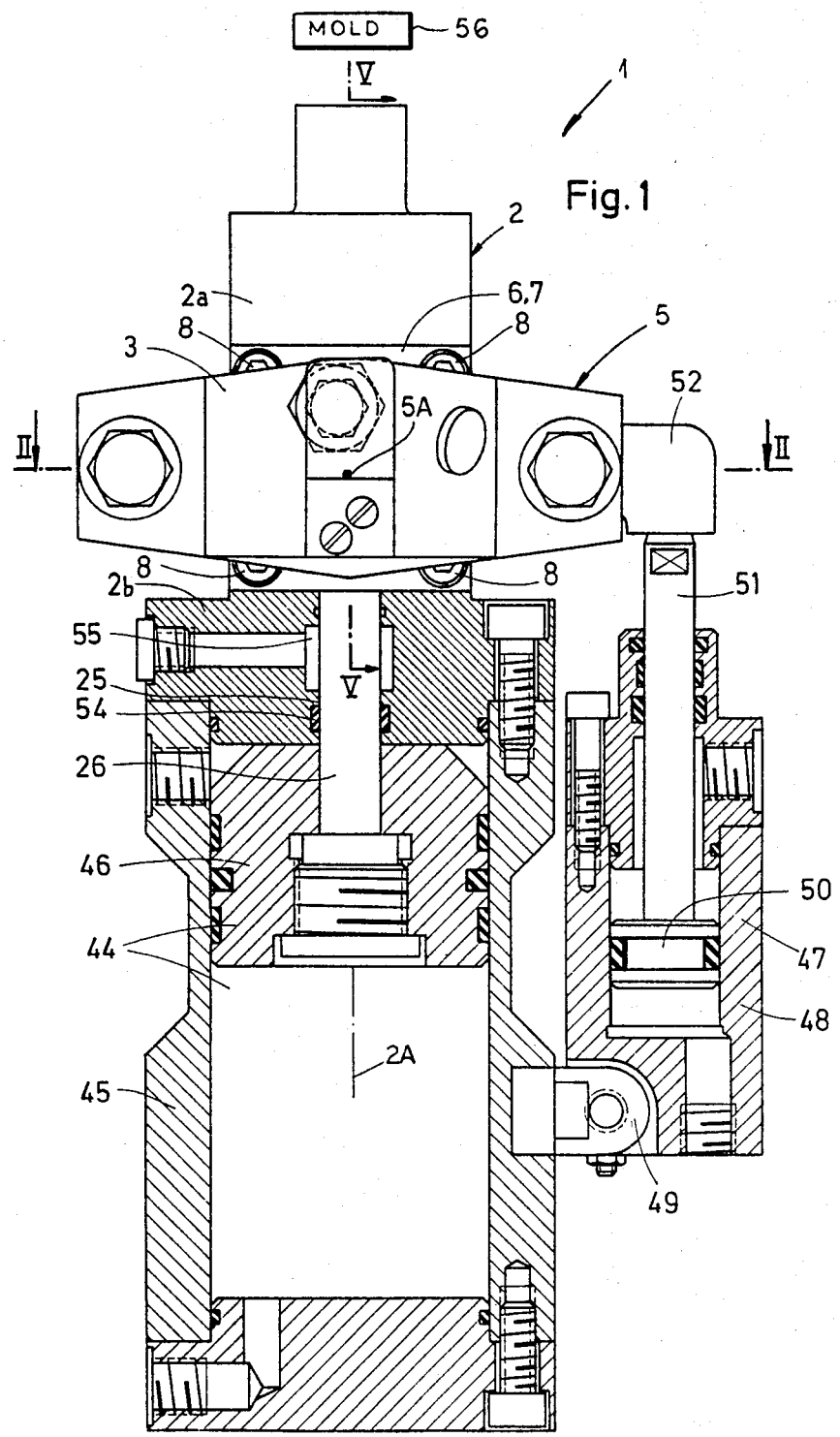
FIG. 1 is a side view partly in axial section of the apparatus according to this invention.

As seen in the drawing, the nozzle 1 basically comprises a stationary housing 2 having stepped cylindrical upper and lower parts 2a and 2b centered on a vertical axis 2A and a rectangular-section middle part 2c whose sides are planar and extend parallel to the axis 2A. A rocker 5 comprised of two substantially identical rocker halves 3 and 4 is limitedly pivotal on the middle part 2a about an axis 5A perpendicular to and traversing the axis 2A. A mold 56 to be supplied with a mixture of two components is attached to the upper end of the upper part 2a and respective supplies 57 and 58 of the two components are connected to the two rocker halves 3 and 4. For the production of a urethane foam one of the supplies is for the polyol component and the other for the isocyanate component.

Identical journals 6 and 7 formed as cylindrical sleeves centered on the axis 5A are secured by bolts 8 to opposite sides of the center housing part 2c and have inner ends engaging flatly against respective planar faces 13 and 14 thereof with seals 21 and 22 preventing leakage therebetween. The two journals 6 and 7 are coaxial and form identical and aligned bores 9 and 10 centered on the axis 5A and receiving cylindrical extensions 11 and 12 of the rocker halves 3 and 4, respectively. These extensions 11 and 12 are pivots or gudgeons and have confronting end faces 15 and 16 that lie flatly against the respective housing faces 13 and 14.

Spacers 17 and 18 that diametrally flank the axis 5A extend between the rocker halves 3 and 4. Bolts 42 and 43 pass through these spacers 17 and 18 and respective stacks 19 and 20 of spring washers ensure that the faces 15 and 16 bear axially toward each other with considerable force. In addition annular seals 23 and 24 are provided between the extensions 11 and 13 and the respective journals 6 and 7.

As best seen in FIG. 5, the housing 2 is formed with an axially throughgoing cylindrical bore 25 centered on the axis 2A and forming a mixing chamber 29 connected at its upper end to the mold 56. A cylindrical piston 26 is axially displaceable in this bore 25, with a seal ring 54 preventing leakage between the piston 26 and bore 25. An annular chamber 55 can surround the piston 26 and be supplied with a lubricant under pressure. In addition the middle part 2a is formed with two axially aligned throughgoing injection passages 27 and 28 offset from the axis 5A and opening at their inner ends into the chamber 29 and at their outer ends at the faces 15 and 16 of the halves 3 and 4.

The piston 26 can move between the fully lowered position of FIG. 5 in which its upper face is slightly below these two passages 27 and 28 and an upper position shown in FIG. 1 in which its unillustrated upper face is virtually at the top of the upper housing part 2a. Upward displacement of this piston 26 therefore pushes the contents of the chamber 29 into the mold 56. This movement is controlled by a double-acting ram 44 provided underneath the housing 2 and having a cylinder 45 and an actuator piston 46 carrying the extrusion piston 26.

The rocker halves 3 and 4 are formed with injection ports 31 and 32 that are axially aligned but offset from the axis 5A and that form the inner ends of respective feed passages 36 and 37 connected to the high-pressure sides of the supplies 57 and 58. The halves 3 and 4 are also provided with respective needle-type valve bodies 32 and 33 controlling flow in the respective feed passages 36 and 37 and adjustable by standard nut and bolt assemblies 34 and 35 to meter the flow in these passages 36 and 37 accurately. In addition the rocker halves 3 and 4 are formed with respective return passages 38 and 39 that open at the respective faces 25 and 16 and lead back to the low-pressure sides of the supplies 57 and 58. These passages 38 and 39 are axially aligned and offset from the axis 5A. The opposite and parallel faces 13 and 14 of the middle part 2c are spectrally identical and formed offset from the respective passages 30 and 31 with grooves 40 and 41 into which the respective passages 38 and 39 open.

Figure 2:
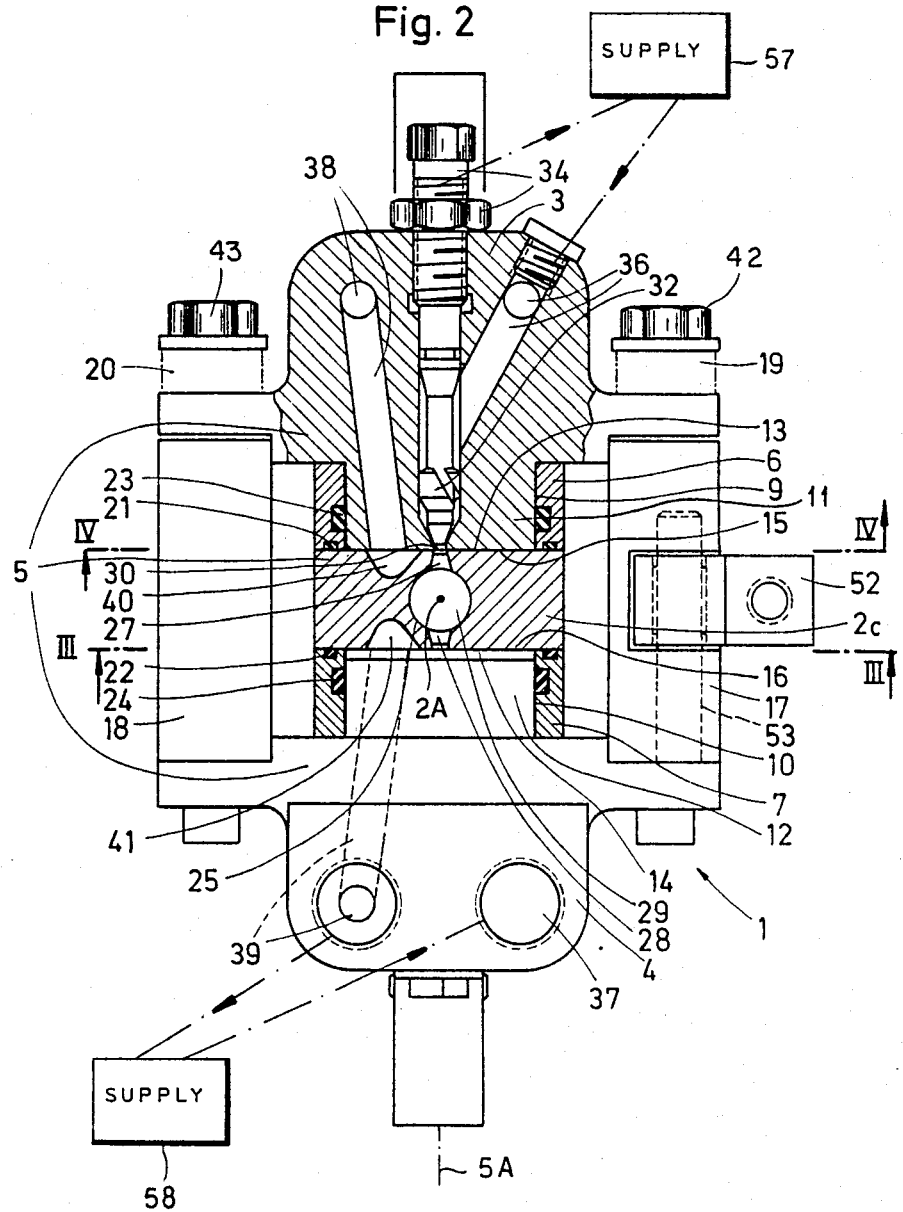
FIG. 2 is a top view partly in section along line II—II of FIG. 1 of the apparatus.

The rocker 5 is pivoted about the axis 5A by a ram 47 having a cylinder 48 pivoted at 49 on the housing 2 via the cylinder 45 and a piston 50 having a piston rod 41 seated in a fitting 52 pivoted on a pin 53 (FIG. 2) on the spacer 17. This ram 47 is double-acting.

Thus the rocker 5 can assume as shown in FIG. 6 a position with the passages 27 and 28 aligned with the respective ports 30 and 31 so that material from the supplies 57 will be injected into diametrally opposite sides of the chamber 29. In addition the rocker can be tipped into the position of FIG. 7 in which the passages 27 and 28 are blocked by the faces 15 and 16, and the ports 30 and 31 open, with the respective return passages 38 and 39, into the grooves 40 and 41.

In the FIG. 6 position, therefore, the chamber 29 will be filled by an accurately metered mixture of the two components. The piston 26 can discharge this mixture in the standard manner into the mold 56 in the FIG. 7 position in which there is flow from each feed passage 36 and 37 through the respective groove 40 or 41 to the respective return passage 38 or 39. This greatly reduces the possibility of the nozzle 1 clogging, and allows the various liquids to be maintained at the right temperature and consistency.

The use of ring seals makes it very easy to prevent leakage between the relatively moving parts, even when the liquids being passed through the apparatus are under relatively high pressure. Furthermore it is possible to provide pressurized compartments like the compartment 55 at the seals 21-24.

I claim:

1. A mixing and extruding nozzle for two reactant components, the nozzle comprising:
a housing formed with
a mixing chamber, a pair of parallel and oppositely directed faces flanking and turned away from the chamber, respective injection passages having inner ends opening into the chamber and outer ends opening at the respective faces, and respective outwardly open grooves in the faces offset from the passages;

a rocker pivotal relative to the housing about an axis perpendicular to and traversing the two faces and offset from the passages and grooves, the rocker having two like halves each formed with a face confronting the respective housing face and a feed passage opening at the respective rocker face offset from the axis, the rocker being pivotal about the axis relative to the housing between a feed position with the feed passages aligned with the respective injection passages and opening therethrough into the chamber and a return position with the feed passages out of alignment with the respective injection passages and communicating through the respective grooves with the respective return passages;

respective supply means for feeding the respective components separately under pressure to the respective feed passages and for withdrawing the respective components from the respective return passages;

respective seal rings engaged between the rocker halves and the housing; and means for relatively pivoting the rocker and housing between the positions, whereby in the feed position the components pass from the respective feed passages through the respective injection passages into the chamber and in the return position the components flow from the feed passages through the respective grooves into the respective return passages.

2. The two-component mixing and extruding nozzle defined in claim 1, further comprising means including a piston engageable in and through said chamber for extruding the resin therein when the rocker is in the return position.

3. The two-component mixing and extruding nozzle defined in claim 1 wherein the return passages are positioned at the rocker faces such that they open into the respective grooves even when the rocker is in the feed position.

4. The two-component mixing and extruding nozzle defined in claim 1 wherein the housing is stationary and the rocker is pivotal thereon about the axis.

5. The two-component mixing and extruding nozzle defined in claim 1 wherein the rocker has spacers secured rigidly between and rigidly interconnecting the two rocker halves.

6. The two-component mixing and extruding nozzle defined in claim 6 wherein the spacer extend parallel to the axis, flank the housing, and each have spring means urging the rocker faces axially toward each other and against the respective housing faces.

7. The two-component mixing and extruding nozzle defined in claim 1 wherein the halves each have a cylindrical projection centered on the axis and having an end face constituting the respective rocker face, one such seal annularly surrounding each such projection, the housing having respective cylindrical journals complementarily receiving the respective projections.

8. The two-component mixing and extruding nozzle defined in claim 8 wherein the seals engage radially between the projections and the respective housings.

9. The two-component mixing and extruding nozzle defined in claim 9 wherein further of the seal rings engage axially between the journals and the housing faces.

10. The two-component mixing and extruding nozzle defined in claim 9 wherein the seal rings include rings engaged radially between the projections and the respective housings and rings engaged axially between the journals and the housing faces.

11. The two-component mixing and extruding nozzle defined in claim 11 wherein the rings are all mounted in the respective journals which are fixed on the housing.

12. The two-component mixing and extruding nozzle defined in claim 1, further comprising means in each rocker half for regulating the flow in the respective feed passage.

* * * * *